United States Patent

Bruyneel et al.

[11] Patent Number: 5,784,874
[45] Date of Patent: Jul. 28, 1998

[54] MULTI-STRAND CORD FOR TIMING BELTS

[75] Inventors: Pol Bruyneel, Wielsbeke; Rik Depraetere, Zwevegem; Frans Van Giel, Otegem, all of Belgium

[73] Assignee: N.V. Bekaert S.A., Zwevegem, Belgium

[21] Appl. No.: 834,273

[22] Filed: Apr. 15, 1997

[30] Foreign Application Priority Data

Jun. 3, 1996  [EP]  European Pat. Off. ............ 96201546

[51] Int. Cl.$^6$ ...................................................... D02G 3/02
[52] U.S. Cl. ................................................ 57/237; 57/902
[58] Field of Search ............................. 57/902, 236, 237, 57/200

[56] References Cited

FOREIGN PATENT DOCUMENTS 0 373 595  6/1990  European Pat. Off. .
2 252 774  8/1992  United Kingdom .

*Primary Examiner*—William Stryjewski
*Attorney, Agent, or Firm*—Foley & Lardner

[57] ABSTRACT

A steel cord (10) for the reinforcement of timing belts or transmission belts comprises only two to five strands (12) tightly twisted with each other in a first direction at a cord twisting pitch. Each of said strands (12) comprises only two to seven steel filaments (14) tightly twisted with each other in this first direction at a strand twisting pitch. The steel filaments (14) have a diameter ranging from 0.03 to 0.40 mm. The ratio strand twisting pitch to filament diameter is greater than 30, the ratio cord twisting pitch to filament diameter is greater than 30, and the ratio cord twisting pitch to strand twisting pitch is greater than 1. Such a steel cord has an acceptable low torsion moment under axial loads.

8 Claims, 2 Drawing Sheets

MULTI-STRAND CORD FOR TIMING BELTS

FIELD OF THE INVENTION

The present invention relates to a steel cord for the reinforcement of timing belts or transmission belts. In what follows, the term "transmission belt" will refer to both a transmission belt and a timing belt. The steel cord is a so-called multi-strand steel cord, i.e. it comprises a number of strands twisted with each other and each of these strands comprises a number of steel filaments twisted with each other.

BACKGROUND OF THE INVENTION

A number of properties are required from steel cords in order to make them suitable for the reinforcement of timing belts and/or transmission belts.

One of these requirements is that transmission belts must run in the middle of the guide wheels and must not show a tendency to rub against either of the upright edges of the guide wheels or, in case the guide wheels have no edges, the transmission belt must have no tendency to slipp off the wheels. As a consequence, the steel cords for reinforcement of transmission belts must be free of residual torsions and must have a low torsion moment when put under an axial load. A further required property is that transmission belts must not stretch too much. As a consequence, the elongation of the reinforcing steel cords should also be limited.

Transmission belts have conveniently been reinforced by multi-strand steel cords of the type m×n S/Z (or Z/S). These steel cords have m strands and each strand has n individual steel filaments. The twisting direction of the n individual steel filaments in the strands is opposite to the twisting direction of the m strands in the cord in order to obtain a low torsion moment. A typical and commonly used multi-strand steel cord is a 3×3 S/Z cord.

A disadvantage of these multi-strand S/Z cords is that the production rate is very limited independent of the question whether or not they are manufactured by means of tubular twisting machines ("cabling machines") or by means of double-twisting machines ("bunching machines").

If the multi-strand S/Z cords are manufactured by means of double-twisting machines the strands are first twisted in S and subsequently the cord is twisted in Z. During the cord twisting, however, part of the S-twisting of the strands is untwisted so that the strands must be twisted in S to a much higher degree than the final degree in the cord. This means that a substantial part of the twisting energy gets lost. If the multi-strand S/Z cords are manufactured by means of tubular twisting machines, the strands are first twisted in S, and the cord is then twisted in Z. Here, no untwisting occurs during the cord twisting, so no twisting energy is lost. The production rate, however, remains limited due to the limited output of tubular twisting machines.

Multi-strand S/S cords exist in the art and are known under the name of Lang's lay cords. Here both the strands and the cord are twisted in the same twisting direction. Such cords can be manufactured in an economical way by means of double-twisting machines without substantial loss of twisting energy. Such existing cords, however, are not suitable for reinforcement of transmission belts due to their imbalance in torsion moment and due to their high elongation.

SUMMARY OF THE INVENTION

It is an object of the present invention to avoid the disadvantages of the prior art.

It is a further object of the present invention to provide for a cord that can be made with a high production rate and that is suitable for the reinforcement of transmission belts.

It is also an object of the present invention to provide for a steel cord with an acceptable low torsion moment.

It is another object of the present invention to provide for a steel cord with a limited elongation.

According to the invention there is provided a steel cord for the reinforcement of timing belts or transmission belts. The steel cord comprises only two to five strands which are tightly twisted with each other in a first direction at a cord twisting pitch. Each of the strands comprises only two to seven steel filaments tightly twisted with each other in the same first direction at a strand twisting pitch. The term "tightly" is here used in contrast with the term "loosely". Loosely twisting means that macro-gaps are formed between neighbouring filaments or neighbouring strands as a consequence of the small axial tensions during twisting or as a consequence of a high preforming. Under higher axial tensions, the filaments and the strands are tightly twisted and no macro-gaps are formed between neighbouring filaments or strands. The term macro-gap refers to gaps having a longitudinal length which is greater than half the relevant twisting pitch. Tightly twisting is done in order to limit the structural elongation of the cord (the structural elongation can be characterized by the part load elongation or PLE). The steel filaments have a diameter ranging from 0.03 to 0.40 mm. and preferably from 0.03 to 0.20 mm in order to be adapted to reinforce transmission belts.

The ratio strand twisting pitch to filament diameter is greater than 30, e.g. greater than 40 or greater than 50 or even greater than 60 and the ratio cord twisting pitch to filament diameter is greater than 30. The ratio cord twisting pitch to strand twisting pitch is greater than 1, e.g. greater than 1.2. The combination of these requirements with respect to cord twisting pitch and to strand twisting pitch have as a consequence that the multi-strand steel cord according to the invention can be made in an economical way (i.e. with a high production rate), that the multi-strand steel cord has an acceptable degree of torsion moment (as will be explained hereafter) and that the multi-strand steel cord has a limited part load elongation.

An additional advantage of an invention multi-strand steel cord is that it has an increased tensile strength in comparison with prior art steel cords.

Still another advantage of an invention multi-strand steel cord is that it has no flare.

Preferably the part load elongation or PLE at 50 Newton of the invention multi-strand steel cord is smaller than 0.40%.

The preferable number of strands and the preferable number of filaments in each strand is three, since this is the most stable configuration.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
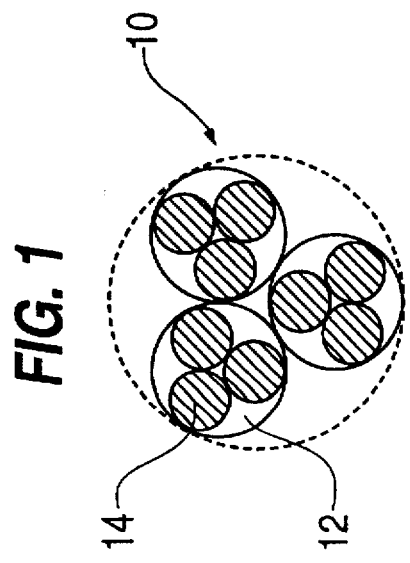
FIG. 1 shows a cross-sectional view of an invention multi-strand steel cord.

FIG. 1 shows a cross-sectional view of an invention multi-strand steel cord 10. The steel cord 10 comprises three strands 12 and each strand comprises three steel filaments 14.

Figure 2:
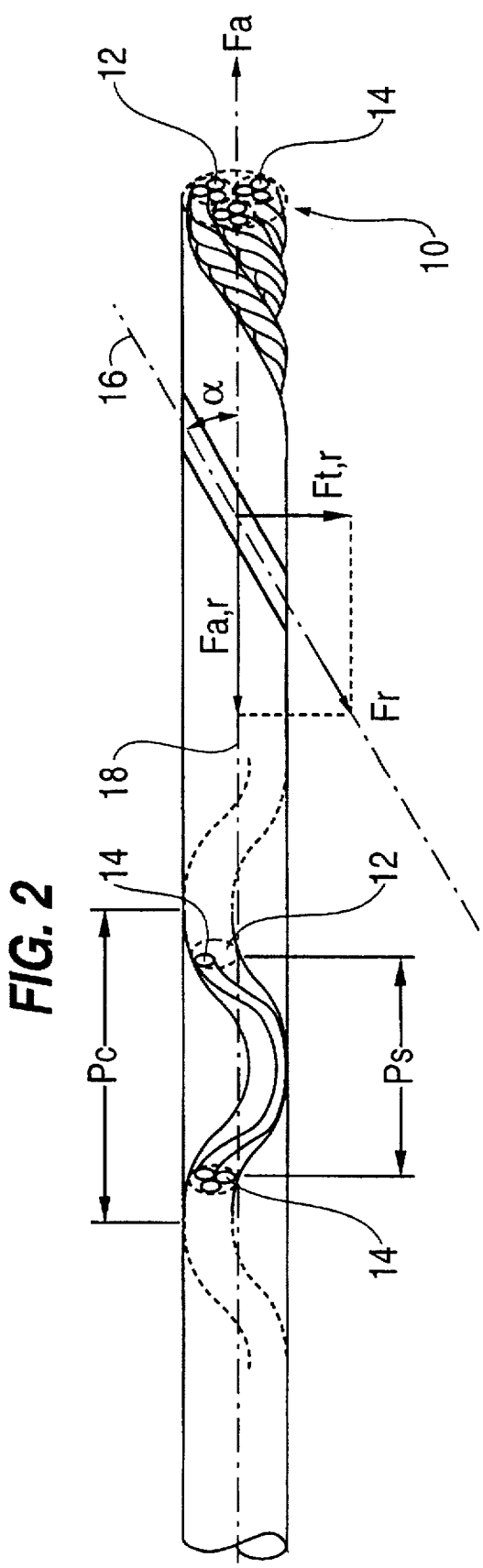
FIG. 2 shows a longitudinal view of an invention multi-strand steel cord.

As can be seen at the right part of FIG. 2, which gives a longitudinal view of the steel cord 10, both the strands 12 and the individual steel filaments 14 have been twisted in the S-direction.

In what follows, an explanation will be given of how the features of the invention multi-strand steel cord 10, and in particular the features of the cord twisting pitch $P_C$ and the strand twisting pitch $P_S$, lead to a torsion moment that is still acceptable for the reinforcement of transmission belts, in spite of the existing prejudice against SS-cords in general in this respect.

Suppose, as is the case with transmission belts which are usually put under an axial force of about 10 to 100 Newton, that a reinforcing multi-strand steel cord 10 is subjected to an axial force $F_a$. This axial force leads to a reaction force $F_r$ that is taken up by the strands 12 and that is directed along the axes 16 of the strands 12 which form an angle α, the so-called twisting angle, with the longitudinal axis 18 of the steel cord 10. The reaction force $F_r$ has an axial component $F_{r,a}$ parallel to the axis 18 and a tangential component $F_{r,t}$ perpendicular to the axis 18. It is the tangential component $F_{r,t}$ which leads to a torsion moment since its working point lies excentrically away from the longitudinal axis 18. The same vector force analysis as hereabove with respect to the strands can be repeated with respect to the individual filaments. If the strands have a twisting direction which is opposite to the twisting direction of the cord, the global torsion moment is decreased and the transmission belts show a decreased tendency of slipping off their guiding wheels. If, on the other hand, the strands have the same twisting direction as has the cord, the global torsion moment is increased and the transmission belts show an increased tendency of slipping off their guiding wheels. This is the reason why, in the prior art, SS-cords have not been used for reinforcement of transmission belts.

A more profound analysis, however, leads to following formula for the tangential component $F_{r,t}$ of the reaction force $F_r$:

$$F_{r,t} = F_a \times tg\ \alpha$$

in other words, the tangential component $F_{r,t}$ is proportional to the tangent of the twisting angle α. The tangent of the twisting angle α is now equal to:

$$tg\ \alpha = (2\pi r)/P_C$$

where r is the radius of the axis of a strand 12, and $P_C$ is the cord twisting pitch that is illustrated on the left part of FIG. 2. The greater the value of the cord twisting pitch $P_C$, the lower the value of tangent α and the lower the torsion moment. For infinite values of the cord twisting pitch $P_C$, which means a cord 10 comprising strands 12 which have not been twisted with each other, there is no torsion moment any more. It is, however, not necessary to go that far. Indeed the inventors have discovered that for a cord twisting pitch $P_C$ and for a strand twisting pitch $P_S$ which are both greater than 30 times the filament diameter, the value of the generated torsion moment is already acceptable in spite of the fact that the cord twisting direction and the strand twisting direction are equal to each other. Of course, the greater the cord twisting pitch $P_C$ and the greater the strand twisting pitch $P_S$, the better. A cord twisting pitch $P_C$ and a strand twisting pitch $P_S$ which is greater than fourty or fifty times the filament diameter are thus preferable.

Figure 3:
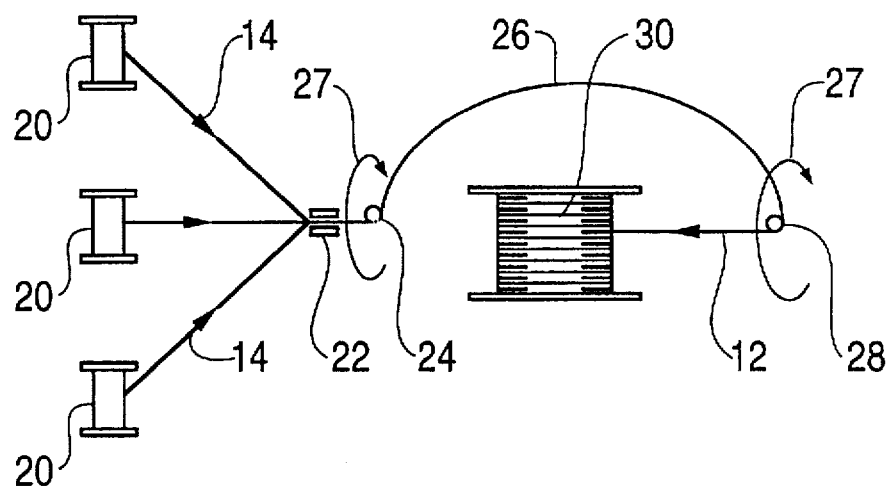
FIGS. 3 and 4 illustrate schematically the way in which an invention multi-strand steel cord can be made.
Figure 4:
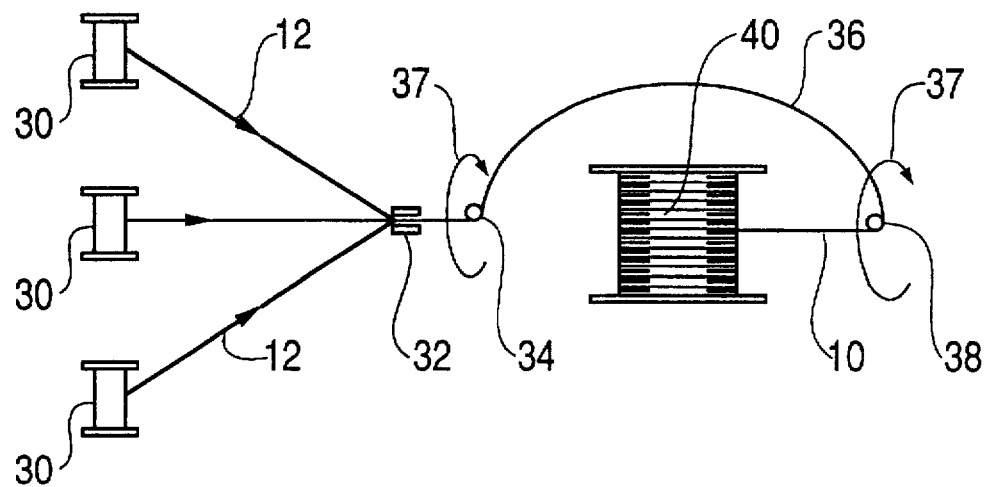

FIGS. 3 and 4 illustrate how an invention multi-strand 3×3 SS cord with a strand twisting pitch $P_S$ of 8 mm and a cord twisting pitch $P_C$ of 12 mm can be manufactured by means of double-twisting machines. FIG. 3 illustrates the way of manufacturing the strands 12 and FIG. 4 illustrates the way of manufacturing the final cord 10. Starting from the left side of FIG. 3, the individual steel filaments 14 are drawn from supply spools 20 and are brought together at an assembly point 22. The assembled filaments 14 receive a first twist in S-direction at the level of a first pulley 24 and are guided over a flyer 26 which rotates in direction of arrows 27. At the level of a second pulley 28 the partially twisted filaments 14 receive a second twist in S-direction so that a strand 12 is partially formed. The partially formed strand 12 is wound upon a spool 30. Having regard to the final cord making step which is yet to come, it is sufficient that the flyer 26 gives to the strands 12 only 41.67 twists per meter. So the partially formed strand 12 has a twist pitch of 24 mm. This process is repeated for each of the three strands 12.

Starting from the left side of FIG. 4 now, the partially formed steel strands 12 are drawn from supply spools 30 and are brought together at an assembly point 32. The assembled strands 12 receive a first twist in S-direction at the level of a first pulley 34 and are guided over a flyer 36 which rotates in the direction of arrows 37 which is the same direction as arrows 27. At the level of a second pulley 38 the partially twisted strands 12 receive a second twist in S-direction so that the final multi-strand steel cord 10 is formed. The formed multi-strand steel cord 10 is then wound upon a spool 40. The flyer 36 gives 83.33 twists per meter to the cord so that a cord twisting pitch $P_C$ of 12 mm is obtained. These 83.33 twists per meter are also added to the twists already received by the individual steel filaments during the strand making process so that the individual steel filaments receive finally $$41.67 + 83.33 = 125\ twists\ per\ meter$$

and so that a final strand twisting pitch $P_S$ of 8 mm is obtained. In this process the twists given to the individual filaments 14 during the final cord making process are added to the twists already given during the strand making process so that no twisting energy gets lost and so that the production rate is high.

In general, loss of twisting energy can be avoided if the cord twisting pitch $P_C$ is greater than the strand twisting pitch $P_S$.

Test 1

The torsion moments in function of increasing axial loads have been measured on a number of cords. For each axial load the torsion moment has been measured on the cord as manufactured according to the above described process and on the cord after having subjected to a stress-relieving operation at 150° C. during 30 minutes. The test basis for each cord is 500 mm. The torsion moments have been measured on a universal torsion machine.

Table 1 summarizes the results.

TABLE 1

| Cord sample | Axial load (Newton) | Torsion moment (Nmm) | | average torsion moment (Nmm/N) | |
|---|---|---|---|---|---|
| | | | stress-relieved | | stress-relieved |
| 3 × 3 × 0.15 | 0 | 0 | 0 | 0.0016 | 0.0017 |
| 9Z/8S | 20 | 0.03 | 0.01 | | |

TABLE 1-continued

| Cord sample | Axial load (Newton) | Torsion moment (Nmm) stress-relieved | | average torsion moment (Nmm/N) stress-relieved | |
|---|---|---|---|---|---|
| prior art | 40 | 0.06 | 0.05 | | |
| | 60 | 0.10 | 0.08 | | |
| | 80 | 0.13 | 0.13 | | |
| | 100 | 0.17 | 0.17 | | |
| 3 × 3 × 0.15 | 0 | 0 | 0 | 0.0140 | 0.0170 |
| 4S/8S | 20 | 0.25 | 0.28 | | |
| reference | 40 | 0.56 | 0.63 | | |
| $P_c/P_s = 2$ | 60 | 0.85 | 0.94 | | |
| $P_c/d = 53.3$ | 80 | 1.16 | 1.3 | | |
| $P_s/d = 26.7$ | 100 | 1.47 | 1.7 | | |
| 3 × 3 × 0.15 | 0 | 0 | 0 | 0.0084 | 0.0108 |
| 4.8S/12S | 20 | 0.18 | 0.19 | | |
| invention | 40 | 0.34 | 0.42 | | |
| $P_c/P_s = 2.5$ | 60 | 0.49 | 0.64 | | |
| $P_c/d = 80$ | 80 | 0.67 | 0.86 | | |
| $P_s/d = 32$ | 100 | 0.80 | 1.08 | | |
| 3 × 3 × 0.15 | 0 | 0 | 0 | 0.0045 | 0.0054 |
| 5.3S/16S | 20 | 0.08 | 0.09 | | |
| invention | 40 | 0.19 | 0.19 | | |
| $P_c/P_s = 3.0$ | 60 | 0.27 | 0.30 | | |
| $P_c/d = 106.7$ | 80 | 0.37 | 0.42 | | |
| $P_s/d = 35.3$ | 100 | 0.46 | 0.54 | | |
| 3 × 3 × 0.15 | 0 | 0 | 0 | 0.0102 | 0.0110 |
| 5.3S/8S | 20 | 0.17 | 0.17 | | |
| invention | 40 | 0.41 | 0.42 | | |
| $P_c/P_s = 1.5$ | 60 | 0.63 | 0.66 | | |
| $P_c/d = 53.3$ | 80 | 0.87 | 0.91 | | |
| $P_s/d = 35.3$ | 100 | 1.10 | 1.16 | | |
| 3 × 3 × 0.15 | 0 | 0 | 0 | 0.0045 | 0.0056 |
| 6.8S/12S | 20 | 0.09 | 0.10 | | |
| invention | 40 | 0.18 | 0.20 | | |
| $P_c/P_s = 1.76$ | 60 | 0.27 | 0.32 | | |
| $P_c/d = 80$ | 80 | 0.36 | 0.44 | | |
| $P_s/d = 45.3$ | 100 | 0.45 | 0.56 | | |
| 3 × 3 × 0.15 | 0 | 0 | 0 | 0.0024 | 0.0019 |
| 8S/16S | 20 | 0.05 | 0.03 | | |
| invention | 40 | 0.10 | 0.05 | | |
| $P_c/P_s = 2$ | 60 | 0.14 | 0.10 | | |
| $P_c/d = 106.7$ | 80 | 0.18 | 0.14 | | |
| $P_s/d = 53.3$ | 100 | 0.22 | 0.19 | | |
| 3 × 3 × 0.15 | 0 | 0 | 0 | 0.0075 | 0.0095 |
| 6S/8S | 20 | 0.11 | 0.13 | | |
| invention | 40 | 0.29 | 0.34 | | |
| $P_c/P_s = 1.33$ | 60 | 0.48 | 0.55 | | |
| $P_c/d = 53.3$ | 80 | 0.67 | 0.76 | | |
| $P_s/d = 40$ | 100 | 0.85 | 1.00 | | |
| 3 × 3 × 0.15 | 0 | 0 | 0 | 0.0031 | 0.0320 |
| 8S/12S | 20 | 0.06 | 0.05 | | |
| invention | 40 | 0.12 | 0.11 | | |
| $P_c/P_s = 1.5$ | 60 | 0.18 | 0.19 | | |
| $P_c/d = 80$ | 80 | 0.25 | 0.27 | | |
| $P_s/d = 53.3$ | 100 | 0.32 | 0.35 | | |
| 3 × 3 × 0.15 | 0 | 0 | 0 | −0.0007 | 0.0005 |
| 9.6S/16S | 20 | −0.03 | 0 | | |
| $P_c/P_s = 1.67$ | 40 | −0.03 | 0.02 | | |
| $P_c/d = 106.7$ | 60 | −0.03 | 0.04 | | |
| $P_s/d = 64$ | 80 | −0.03 | 0.04 | | |
| | 100 | −0.03 | 0.07 | | |

Generally, it can be derived from Table 1 that with increasing strand twisting pitches $P_S$ and with increasing cord twisting pitches $P_C$, the values of the torsion moments decrease.

Remarkable is that the last tabled cord sample, the 3×3×0.15 9.6S/16S cord, did not show an increase in torsion moment with increasing axial loads and did show a level of torsion moment which was even substantially below the level of torsion moment of the prior art 3×3×0.15 9Z/8S cord.

Test 2

In a second test the part load elongation PLE at 50 Newton (in %), the tensile strength $R_m$ (in MPa or Newton/mm²) and the presence or absence of flare has been determined for the same cord samples as in test 1.

Table 2 hereunder summarizes the results.

TABLE 2

| Cord sample | PLE cord (%) | $R_m$ (MPa) | Flare |
|---|---|---|---|
| 3 × 3 × 0.15 9Z/8S prior art | 0.21 | 2649 | yes |
| 3 × 3 × 0.15 4S/8S reference | 0.54 | 2574 | no |
| 3 × 3 × 0.15 4.8S/12S invention | 0.45 | 2652 | no |
| 3 × 3 × 0.15 5.3S/16S invention | 0.34 | 2673 | no |
| 3 × 3 × 0.15 5.3S/8S invention | 0.45 | 2638 | no |
| 3 × 3 × 0.15 6.8S/12S invention | 0.27 | 2703 | no |
| 3 × 3 × 0.15 8S/16S invention | 0.28 | 2720 | no |
| 3 × 3 × 0.15 6S/8S invention | 0.36 | 2596 | no |
| 3 × 3 × 0.15 8S/12S invention | 0.23 | 2672 | no |
| 3 × 3 × 0.15 9.6S/16S invention | 0.24 | 2649 | no |

Generally, the part load elongation PLE decreases with increasing strand twisting pitches $P_S$ and with increasing cord twisting pitches $P_C$. Also in the same way, the tensile strength $R_m$ increases with increasing strand twisting pitches $P_S$ and with increasing cord twisting pitches $P_C$. All multi-strand SS cords do not show flare, while the prior art multi-strand ZS cord has flare, i.e. the spreading of the filament ends or strand ends after cutting.

A further advantage of the invention multi-strand SS cord is that the cost of manufacturing is about 30% or even more lower than the cost of manufacturing a prior art SZ cord.

It goes without saying that the present invention is independent of the particular coating on the steel filaments. In this way, the steel filaments of an invention multi-strand steel cord may be provided with a rubber adherable coating in case the transmission belt is made of rubber. Such rubber adherable coating may be brass, bronze or another binary copper alloy such as CuNi or CuCo or a ternary copper alloy such as Cu-Zn-Ni, CuSnCo, CuZnSn or Cu-Zn-Co.

In the same way, the steel filaments of an invention multi-strand steel cord may be provided with a corrosion-resistant coating such as zinc or a zinc alloy (e.g. a zinc aluminium alloy e.g. having an eutectoid composition of about 95% Zn and about 5% Al) in case the transmission belt is made of a polymer such as polyurethane.

We claim:

1. A steel cord (10) for the reinforcement of timing belts or transmission belts, said steel cord comprising only two to five strands (12) tightly twisted with each other in a first direction at a cord twisting pitch, each of said strands (12) comprising only two to seven steel filaments (14) tightly twisted with each other in said first direction at a strand twisting pitch, said steel filaments (14) having a diameter ranging from 0.03 to 0.40 mm, the ratio strand twisting pitch to filament diameter being greater than 30, the ratio cord twisting pitch to filament diameter being greater than 30, the ratio cord twisting pitch to strand twisting pitch being greater than 1.

2. A steel cord according to claim 1 wherein the part load elongation at 50 Newton of said steel cord is smaller than 0.40%.

3. A steel cord according to claim 1 wherein the number of strands is three.

4. A steel cord according to claim 1 wherein the number of steel filaments in each strand is three.

5. A steel cord according to claim 1 wherein the ratio cord twisting pitch to strand twisting pitch is greater than 1.2.

6. A steel cord according to claim 1 wherein the ratio strand twisting pitch to filament diameter is greater than 40.

7. A steel cord according to claim 6 wherein the ratio strand twisting pitch to filament diameter is greater than 50.

8. A steel cord according to claim 7 wherein the ratio strand twisting pitch to filament diameter is greater than 60.

* * * * *